United States Patent [19]

Sato

[11] Patent Number: 4,636,837

[45] Date of Patent: Jan. 13, 1987

[54] TIME BASE CONVERSION APPARATUS

[75] Inventor: Yuichi Sato, Kawasaki, Japan

[73] Assignee: Canon Kabushiki Kaisha, Tokyo, Japan

[21] Appl. No.: 487,920

[22] Filed: Apr. 22, 1983

[30] Foreign Application Priority Data

Apr. 28, 1982 [JP]  Japan ................................. 57-72370

[51] Int. Cl.⁴ ........................................... H04N 9/491
[52] U.S. Cl. .................................. 358/21 R; 358/320; 358/337
[58] Field of Search ............... 358/140, 337, 338, 320, 358/331, 321, 322, 325, 326, 323, 339, 11, 21 R

[56] References Cited

U.S. PATENT DOCUMENTS 4,112,459  9/1978  Gautier et al. ....................... 358/332
4,206,479  6/1980  Hayward ......................... 358/339 X
4,563,700  1/1986  Sato ....................................... 358/75

Primary Examiner—Robert L. Richardson
Attorney, Agent, or Firm—Fitzpatrick, Cella, Harper & Scinto

[57] ABSTRACT

A time base conversion apparatus has a first time base conversion circuit for subjecting an input signal to a time base conversion, a filter for filtering an output signal from the first time base conversion circuit, and a second time base conversion circuit for subjecting an output signal from the filter to a time base conversion. The number of output signals is different from the sampling frequency of the input signal.

29 Claims, 14 Drawing Figures

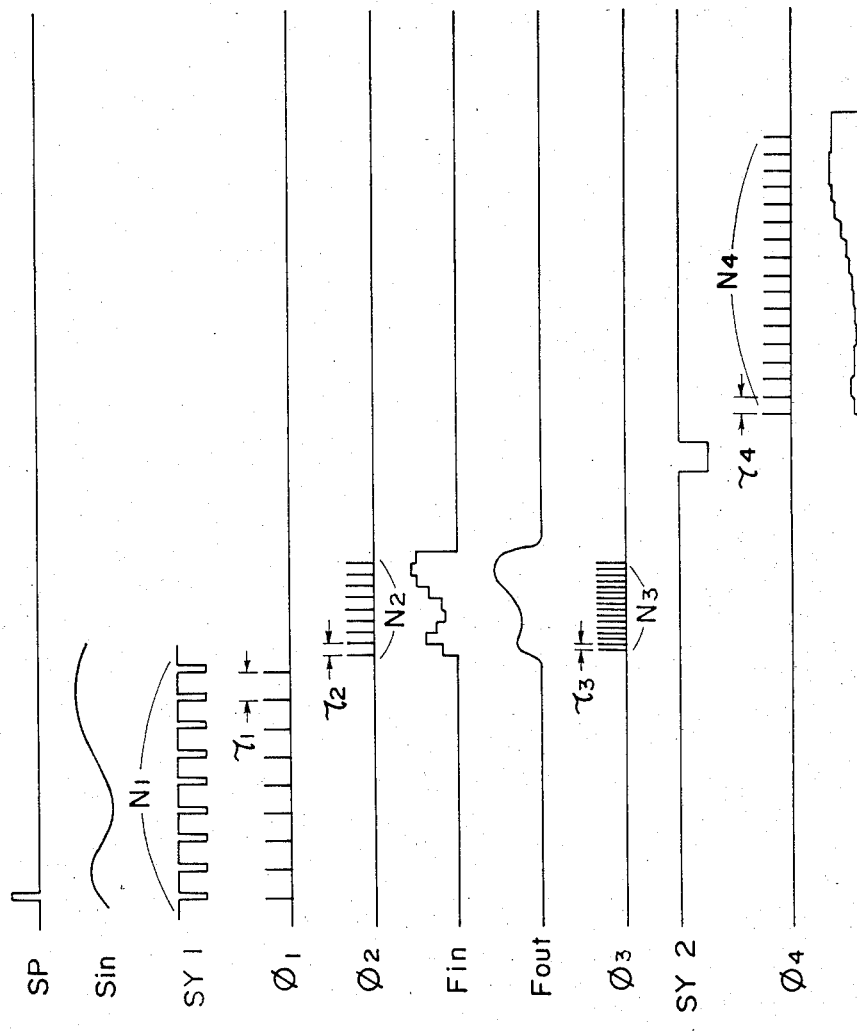

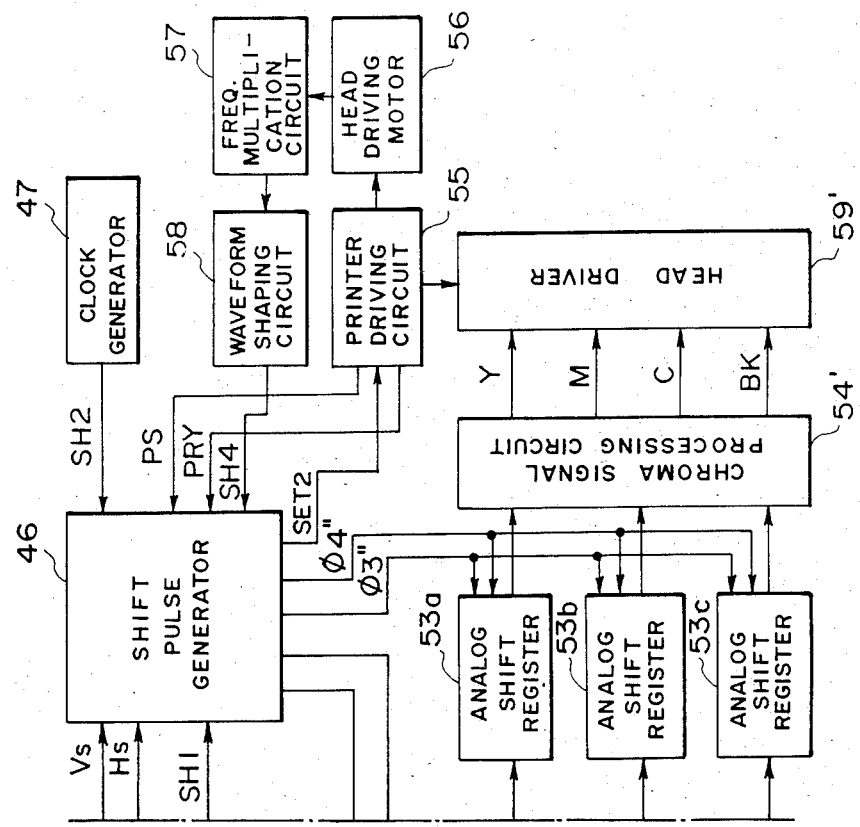

TIME BASE CONVERSION APPARATUS

BACKGROUND OF THE INVENTION

The present invention relates to a time base conversion apparatus for allowing exchange of signals between two systems having different time bases. In the prior art, for example, when obtaining a printed image from an NTSC television signal, a television signal of 1/30 sec carries information corresponding to an image of one frame, while the printer cannot complete printing thereof within 1/30 sec. A memory for storing the image of one frame, that is, a 1-frame memory, may be incorporated. However, the 1-frame memory must have a large memory capacity and is therefore very expensive. If a 1-frame memory is not used, time base conversion must be performed since the input television signal and the printing signal have different time bases. The time base conversion may be performed by adjusting the ratio of input and output clocks of an analog shift register. However, when this method is adopted, the number of the sampling picture elements of the input signal becomes the same as that of the output signal. In other words, the number of sampling picture elements of an input signal determines that of an output signal, thus limiting the size of the output image. In order to produce an image of a larger size, the obtained output picture elements must be interpolated, which requires a complex processing circuit.

When time base conversion is performed including the case of printing with an image signal, the number of sampling picture elements of an input signal coincides with that of an output signal.

SUMMARY OF THE INVENTION

The present invention has been made in consideration of this and has as an object to provide a time base conversion apparatus which is capable of converting the number of sampling picture elements between input and output signals simultaneously with the time base conversion.

It is another object of the present invention to provide a time base conversion apparatus which is capable of reducing to the minimum degradation of an output signal with respect to an input signal after conversion of the number of sampling picture elements between input and output signals.

It is still another object of the present invention to provide a time base conversion apparatus which may be conveniently used for a video printer for producing a printed image from an input video signal.

The above and other objects and features of the present invention will become apparent from the following description when taken in conjunction with the accompanying drawings.

BRIEF DESCRIPTION OF THE DRAWINGS

FIG. 2 shows the waveforms of signals at the respective portions of the apparatus shown in FIG. 1;

DETAILED DESCRIPTION OF THE PREFERRED EMBODIMENTS

Figure 1:
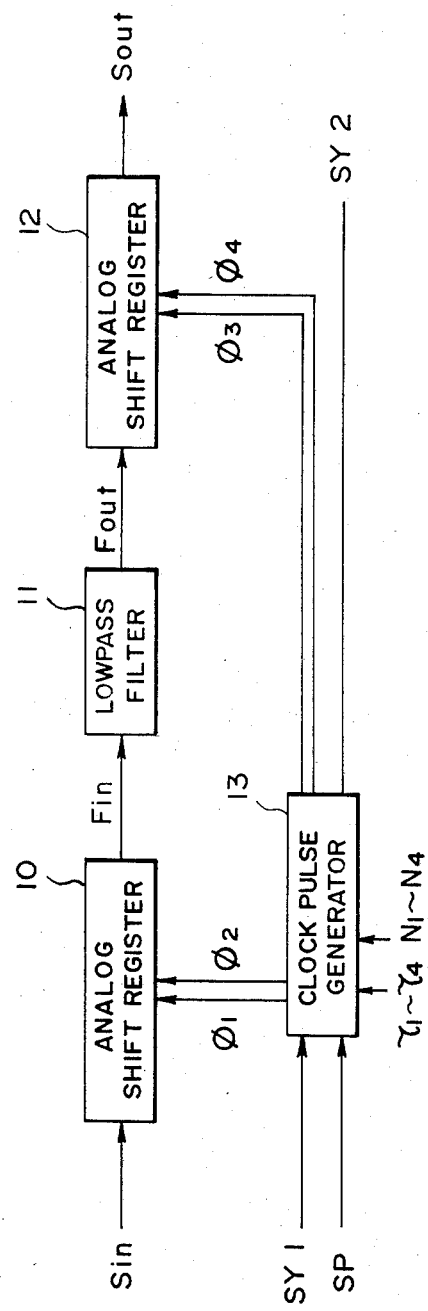
FIG. 1 is a block diagram of a time base conversion apparatus according to the first embodiment of the present invention.

A time base conversion apparatus according to the first embodiment of the present invention will now be described with reference to FIG. 1.

An input analog signal Sin is applied to a first analog shift register 10 which then produces an output signal Fin. The signal Fin is applied to a lowpass filter 11 which produces an output signal Fout. The signal Fout is applied to a second analog shift register 12 which produces an output signal Sout. A clock pulse generator 13 receives a start pulse SP and a sync signal SY1 at the input side, and a sync signal SY2 at the output side. The clock pulse generator 13 supplies to the first analog shift register 10 a clock pulse $\phi 1$ for introducing the input analog signal Sin into the first analog shift register 10 and a clock pulse $\phi 2$ for reading out the signal Fin from the first analog shift register 10. The clock pulse generator 13 also supplies to the second analog shift register 12 a clock pulse $\phi 3$ for introducing the output Fout from the lowpass filter 11 into the second analog shift register 12 and a clock pulse $\phi 4$ for reading out the signal Sout from the second analog shift register 12.

FIG. 2 shows examples of timing charts of the various signals as described above. The frequency and the number of the clock pulses may be freely selected.

The mode of operation of the apparatus of the first embodiment of the present invention will now be described. When the start pulse SP synchronous with the sync signal SY1 is supplied to the clock pulse generator 13, first sampling shift pulses $\phi 1$ of period $\tau 1$ are supplied to the first analog shift register 10. Then, the input signal Sin is sequentially sampled in response to the pulses $\phi 1$ and sampled signals Ak (where k=1, ..., N1) are stored in the first analog shift register 10. Although N1 need not be equal to the number of stages of the first analog shift register 10, extra shift clock pulses must be applied if N1 is smaller than the number of stages of the first analog shift register 10. In the following description, N1 is assumed to be equal to the number of stages of the first analog shift register 10. When N1 clock pulses of clock $\phi 1$ are generated, the sampled signals Ak are set in the first analog shift register 10. At this time, A1 is stored in the last state (N1th stage). When second read shift pulses $\phi 2$ are supplied to the first analog shift register 10, the signals A1, ..., AN2 are sequentially read out at a period $\tau 2$. This signal is shown as Fin and is supplied to the lowpass filter 11. The lowpass filter 11 has a cutoff frequency fc; the input signal Fin is smoothed by the cutoff frequency fc and the smoothed output signal Fout from the filter 11 has the cutoff frequency fc. If the period $\tau 2$ is sufficiently smaller than $\frac{1}{2}$fc, that is, if fc is smaller than half the frequency of the clocks $\phi 2$, the sampling distortion in the signal Fout may be negligible. If this condition is satisfied, the signal Fout has a waveform equivalent to that of a signal obtained by compressing input signal Sin by $\tau 2/\tau 1$ times in time base conversion and passing the compressed one through a lowpass filter having a cutoff frequency fc. Since the signal Fin is read out by the second shift pulses $\phi 2$ having the period $\tau 2$ and numbering N2, the signal Fin is available.

or effective for a time period of $\tau 2 \cdot N2$. During this time period, sampling is performed by third sampling shift pulses $\phi 3$ having a period $\tau 3$ and numbering N3, and the sampled signals are sequentially introduced into and shifted in the second analog shift register 12. It is also assumed here that the number of stages of the second analog shift register 12 is equal to N3. Then, the signal Fout is sampled and introduced into register 12 for a time period of $\tau 3 \cdot N3$. When $\tau 2 \cdot N2 > \tau 3 \cdot N3$, only part of the effective portion of the signal Fout can be stored in the second analog shift register. Conversely, when $\tau 2 \cdot N2 < \tau 3 \cdot N3$, even the non-effective portion of the signal Fout is introduced into the second analog shift register. However, the non-effective portion may be neglected. Alternatively, the input of the analog shift register may be switched to receive a signal of a suitable level during the time when the signal Fout is not effective. Read-out of the signals from the second analog shift register 12 is performed at a period $\tau 4$ in synchronism with the sync signal SY2 by the fourth read pulses $\phi 4$ numbering N4.

The number N4 of the pulses $\phi 4$ may be smaller than the number of stages of the second analog shift register 12. When $\tau 2 \cdot N2 < \tau 3 \cdot N3$, an output Sout may be obtained as a converted signal during the effective period of the signal Fout provided $N4 = \tau 2 \cdot N2/\tau 3$.

Since the signal Sout is thus sampled at the period $\tau 3$ and reproduced at the period $\tau 4$, it is equivalent to a signal which is obtained by expanding the signal Fout by $\tau 4/\tau 3$ times and sample-holding it at the period $\tau 4$. Thus, the frequency characteristics of the lowpass filter 11 involve scale conversion along the frequency axis with respect to the signal Sout, and the seeming cutoff frequency becomes $(\tau 3/\tau 4)$ times the cutoff frequency, that is, $(\tau 3/\tau 4)$fc. As a consequence, the signal Sout becomes equivalent to a signal which is obtained by expanding the signal waveform of the signal Sin by $(\tau 4 \cdot \tau 2/\tau 3 \cdot \tau 1)$ times, multiplying the cutoff frequency of the lowpass filter by $(\tau 3/\tau 4)$, and sampling and holding the signal at the period $\tau 4$.

Figure 3A:
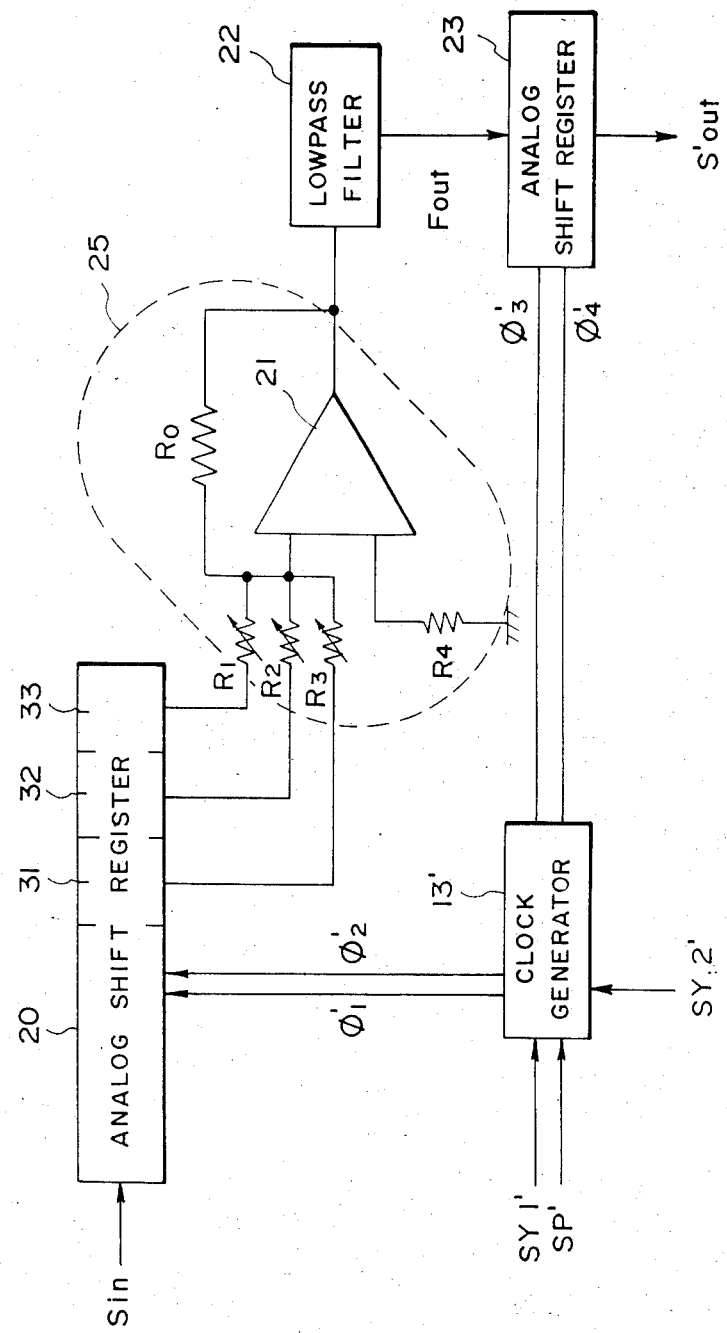
FIG. 3A is a block diagram of a time base conversion apparatus according to the second embodiment of the present invention.

FIG. 3A is a block diagram of a time base conversion apparatus according to the second embodiment of the present invention. In FIG. 3A, the same parts as those in FIG. 1 are indicated by the same reference numerals with a superscript "'". New parts in the apparatus of FIG. 3A include a first analog shift register 20, an operational amplifier 21, a weighting circuit 25, a lowpass filter 22, a second analog shift register 23, last three stages 31, 32 and 33 of the first analog shift register 20, and registors R0 to R4.

When the weighting circuit 25 is used, desired filter characteristics such as noise removal characteristics may be obtained by setting different resistances of the resistors R1, R2 and R3. The weighting need not be performed by the three last stages of the analog shift register but may be performed by any other number of last stages.

Figure 3B:
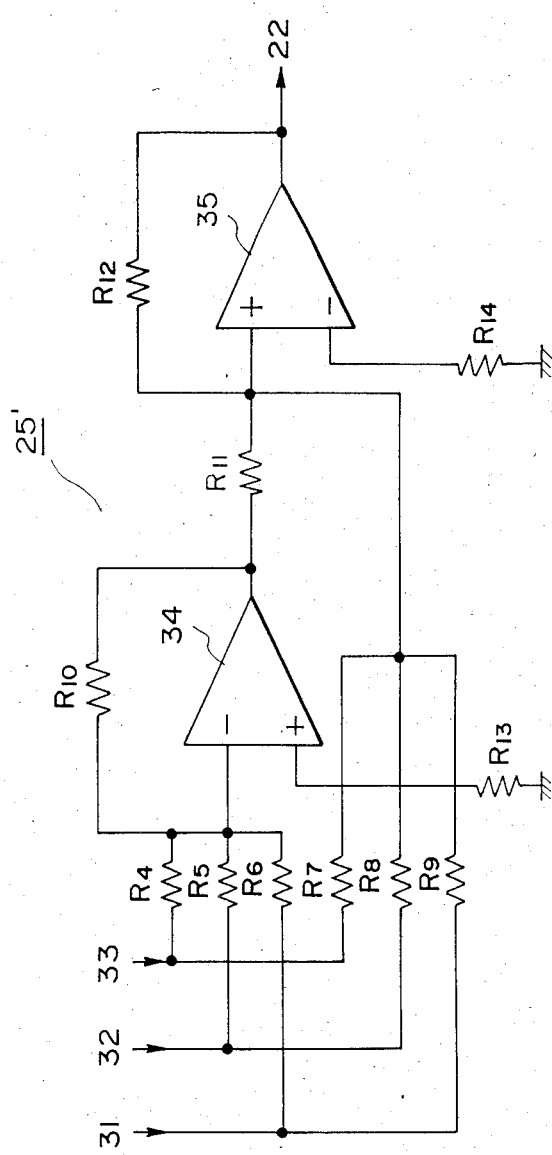
FIG. 3B is a circuit diagram of another example of a weighting circuit shown in FIG. 3A.

FIG. 3B shows another example of the weighting circuit 25. The arrangement shown in FIG. 3B includes an inverting amplifier 34 and a non-inverting amplifier 35. With both the inverting and non-inverting functions, free design of filter characteristics is facilitated. Filter characteristics which include both edge emphasis and noise removal may also be obtained.

Figures 4, 4B:
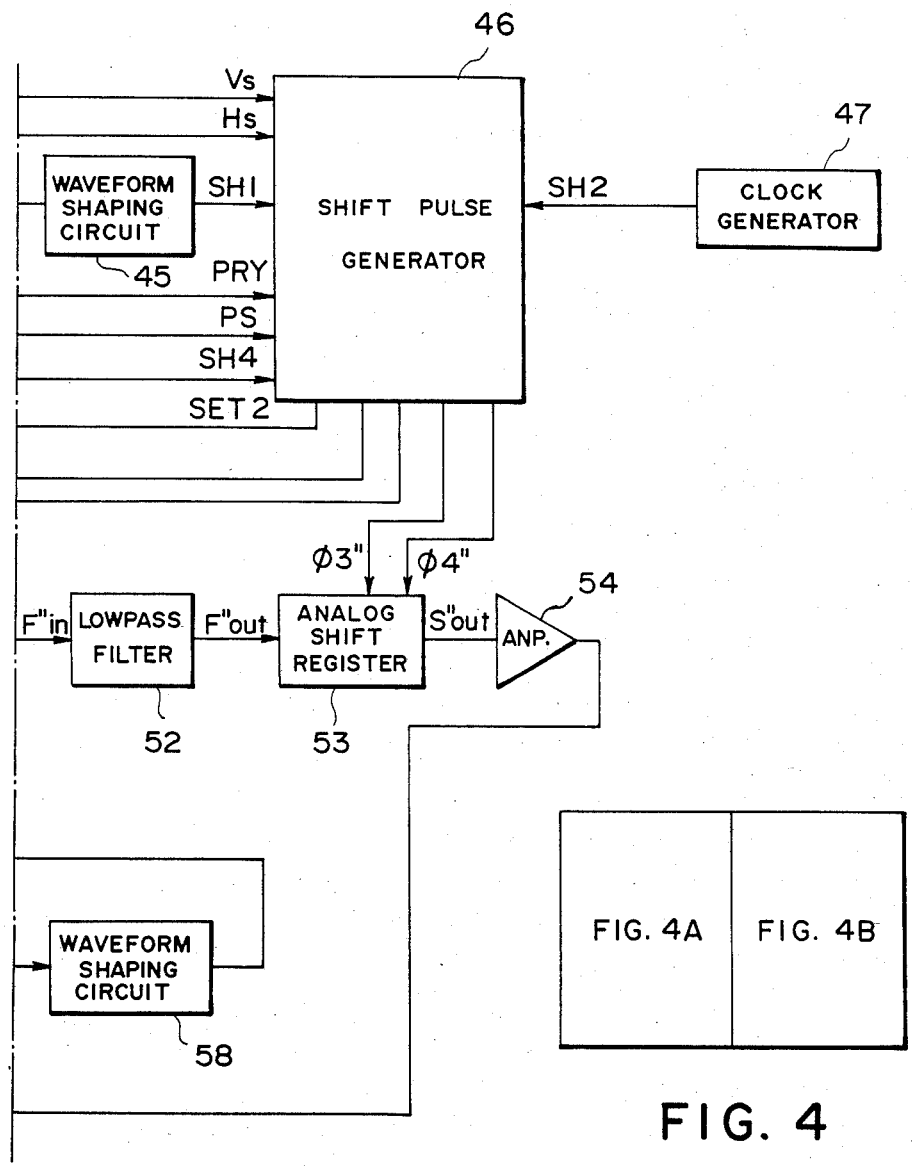
FIG. 4 composed of FIGS. 4A and 4B is a block diagram of a time base conversion apparatus of the present invention as applied to a video printer.
Figure 4A:
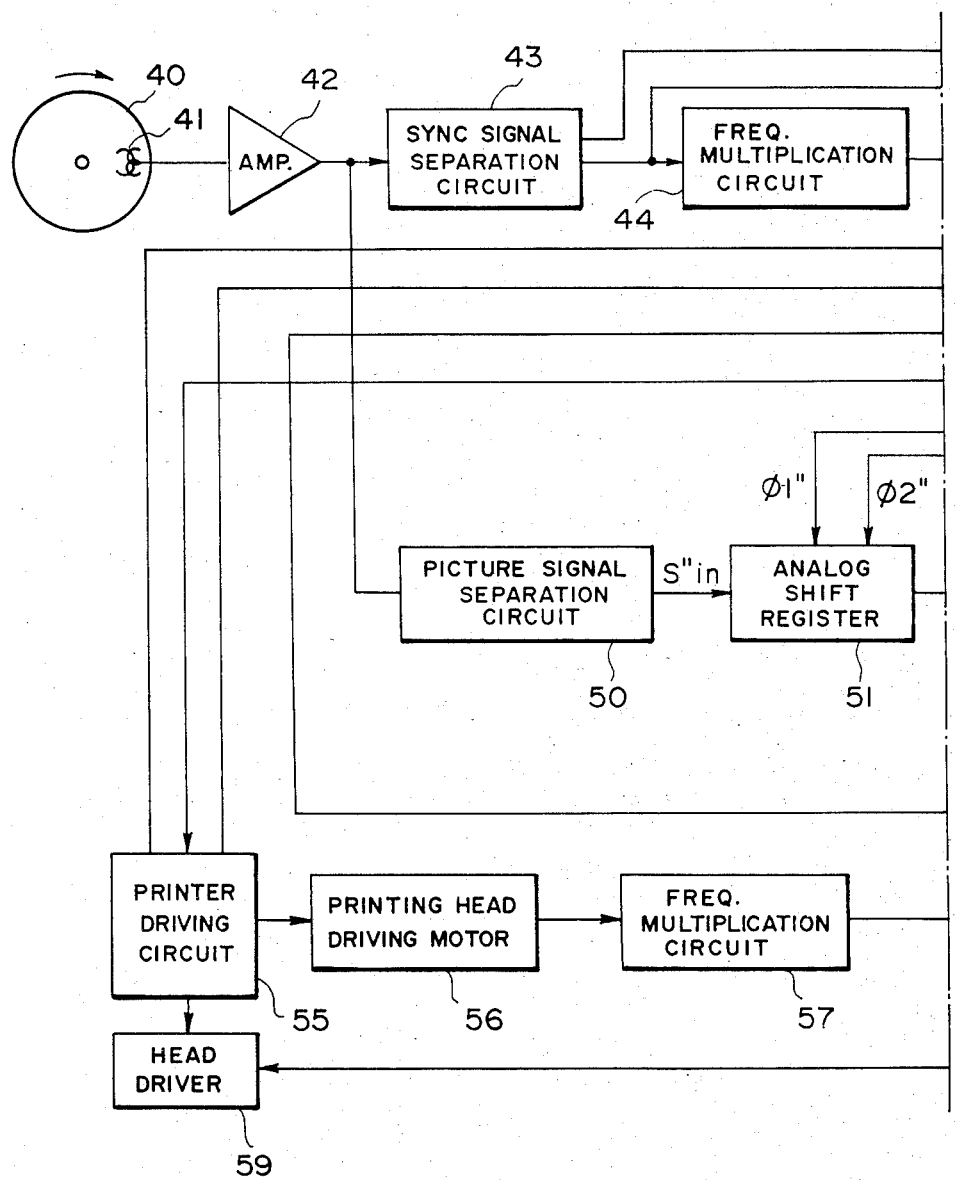

FIG. 4 shows the third embodiment of the present invention wherein the arrangements shown in FIGS. 3A and 3B are applied to a serial video printer for printing a video signal. The system shown in FIG. 4 includes a magnetic disc 40 on which is recorded a video signal of 1 field, a reproducing head 41 for reproducing the signal on the magnetic disc 40, a reproduction amplifier 42, a sync signal separation circuit 43 for separating a vertical sync signal Vs and a horizontal sync signal Hs from the reproduced video signal, a frequency multiplication circuit 44 for multiplying the horizontal sync signal Hs, a waveform shaping circuit 45, a shift pulse generator 46, a clock generator 47 for generating high frequency reference clocks SH2, a picture signal separation circuit 50 for separating a picture signal from the reproduced video signal, a first analog shift register 51, a lowpass filter 52, a second analog shift register 53, an amplifier 54, and a printer driving circuit 55. The printer driving circuit 55 produces a print start signal PS and a print ready signal PRY which indicates that printing may be performed by the printer. The system further includes a printing head driving motor 56 for driving the printing head in the main scanning direction, a frequency multiplication circuit 57 for multiplying the pulse signals in accordance with the rotational frequency of the driving motor 56, a waveform shaping circuit 58, and a head driver 59 for driving the ink jet head or the like with a voltage corresponding to an output voltage from the amplifier 54.

The magnetic disc 40 is rotated at 60 revolutions per second in the direction indicated by the arrow by a motor (not shown). The video signal of one field is reproduced by the reproducing head 41. A reproduced video signal is a composite signal which consists of sync signals and a picture signal and which is supplied to the sync signal separation circuit 43 and the picture signal separation circuit 50 through the reproduction amplifier 42. The sync signal separation circuit 43 separates the vertical and horizontal sync signals Vs and Hs, which are respectively supplied directly to the shift pulse generator 46. At the frequency multiplication circuit 44, the horizontal sync signal Hs is multiplied by the sampling number of the first analog shift register 51 and converted into a pulse signal with a repetition ratio of the sampling number times that of sync signal Hs. This pulse signal is then shaped by the waveform shaping circuit 45 and is supplied to the shift pulse generator 46 as a shift pulse SH1. The frequency multiplication circuit 44 may comprise a PLL (Phase Locked Loop) circuit for obtaining correct shift pulses. Since the shift pulse SH is a pulse obtained by multiplying the horizontal sync signal Hs, it must always contain a constant number of pulses within a horizontal sync period irrespective of the jitter of the reproduced video signal.

Output reference clocks SH2 from the clock generator 47 are supplied to the shift pulse generator 46. An output from the printer driving circuit 55 drives the printing head driving motor 56. A pulse representing the rotational frequency of the motor 56 is multiplied at the frequency multiplication circuit 57 so as to obtain the pulses, the number of which corresponds to the number of the recording picture elements during one main scanning operation of the recording head, that is, the number of the output stages of the second register 53. The frequency multiplication circuit 57 preferably comprises a PLL circuit. The multiplied pulse is shaped and is then supplied to the shift pulse generator 46 as a shift pulse SH4. The frequency of the pulse SH4 changes in accordance with the drift in the travel speed of the recording head.

On the basis of the vertical and horizontal sync signals Vs and Hs, the print start signal PS, and the print ready signal PRY, the shift pulse generator 46 converts the shift pulses SH1 and SH4 into shift pulses $\phi 1''$, $\phi 2''$, $\phi 3''$ and $\phi 4''$ and also controls the printer driving circuit 55. The details of the shift pulse generator 46 will be described later.

Meanwhile, the picture signal is subjected to time base conversion by the first analog shift register 51, the lowpass filter 52 and the second analog shift register 53. The resultant signal is supplied to the head driver 59. The head driver 59 operates so as to print at a density corresponding to the level of the picture signal.

Figures 5, 5B:
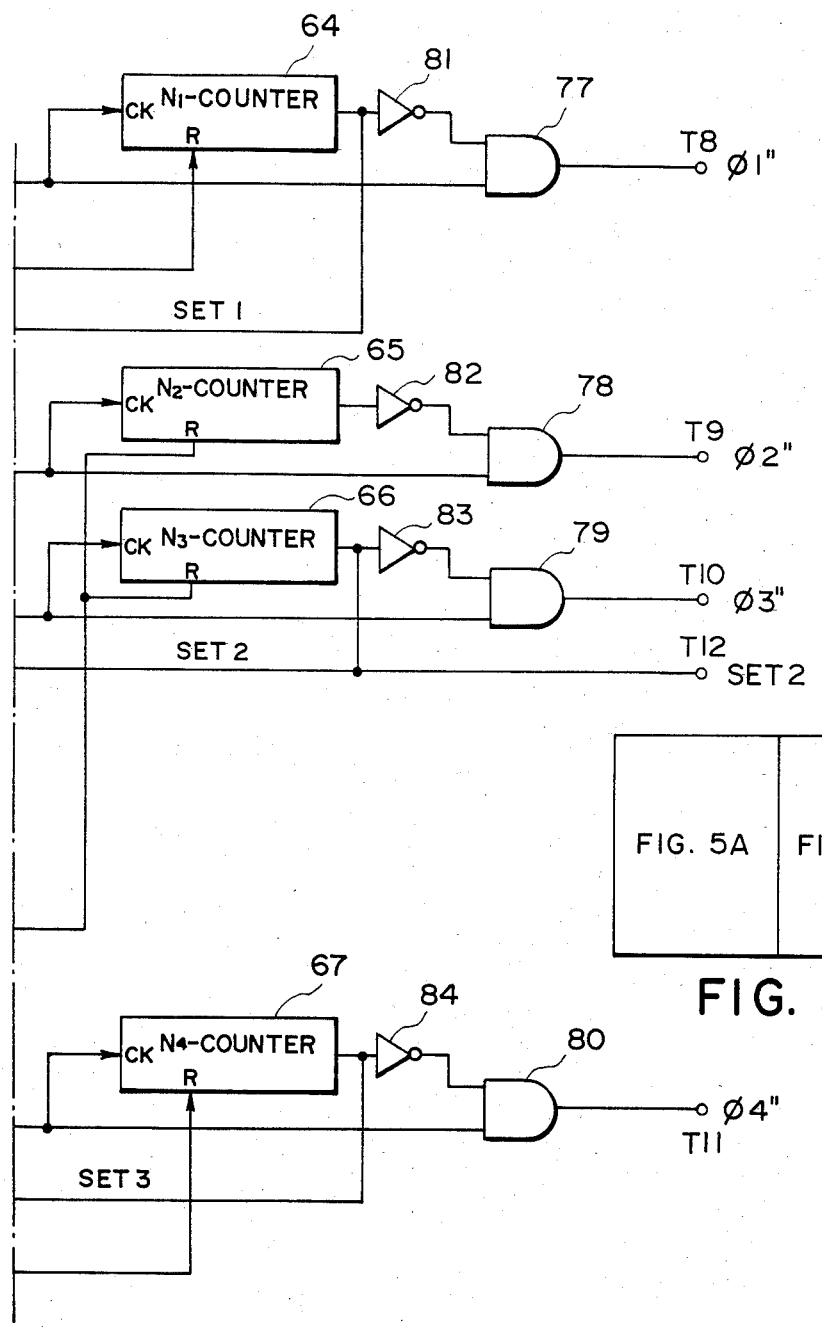
FIG. 5 composed of FIGS. 5A and 5B is a detailed circuit diagram of a shift pulse generator shown in FIG. 4.
Figure 5A:
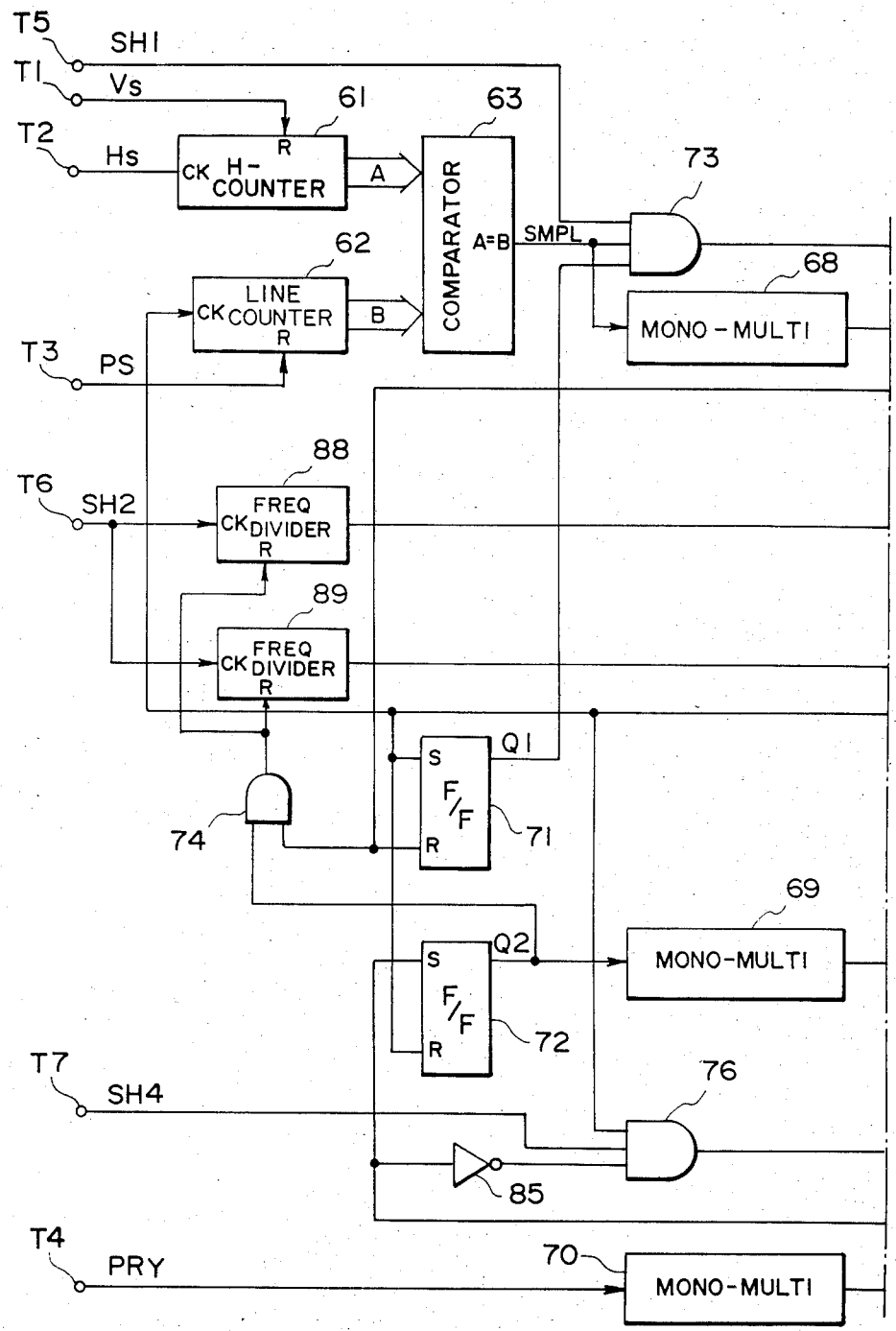
Figure 6:
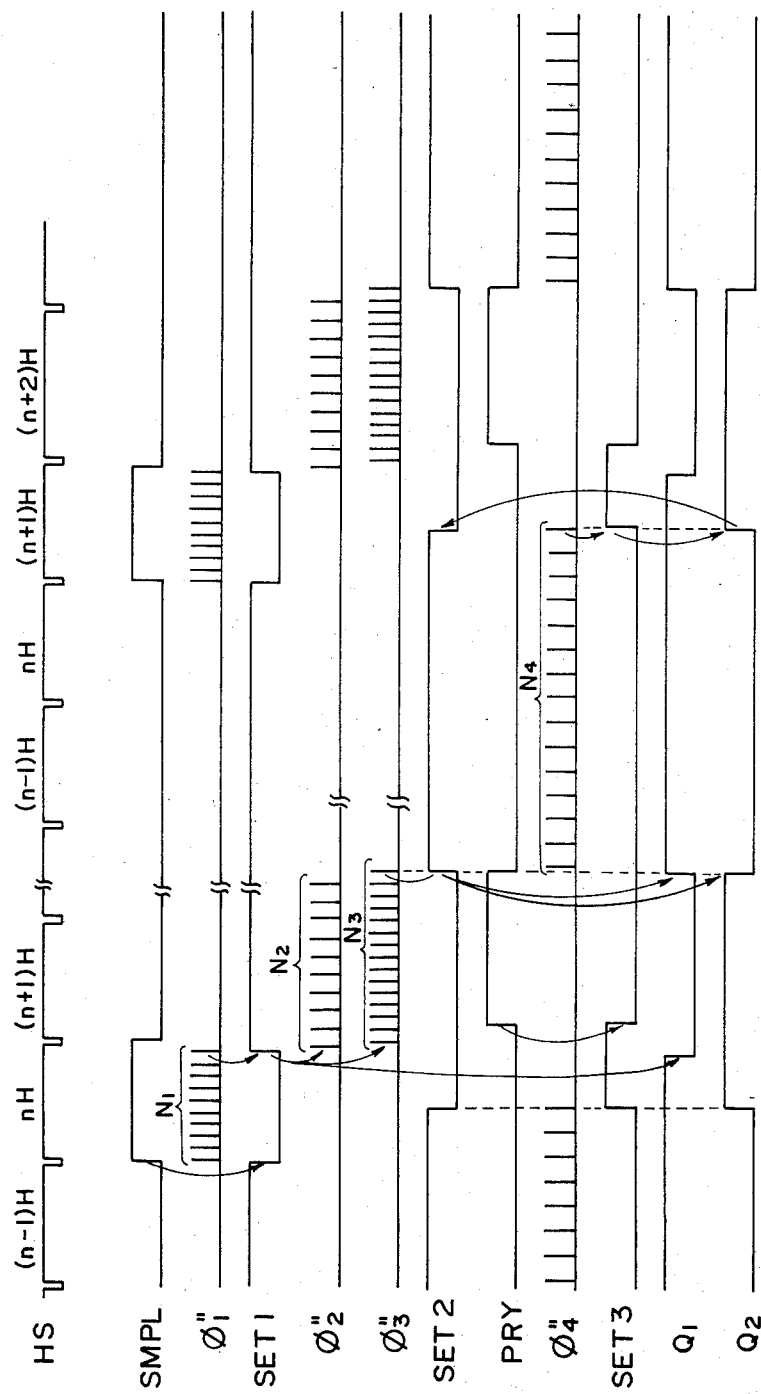
FIG. 6 shows the waveforms of signals at the respective portions of the generator shown in FIG. 5.

The configuration and operation of the shift pulse generator 46 will now be described. FIG. 5 is a detailed circuit diagram of the shift pulse generator 46, and FIG. 6 shows timing charts of the waveforms of the signals at respective portions of the circuit shown in FIG. 5.

The shift pulse generator 46 shown in FIG. 5 includes input terminals T1 to T7; output terminals T8 to T12; an H-counter 61 for counting the number of horizontal scanning lines as to which line is currently being reproduced by the reproducing head 41; a line counter 62 for counting the number of horizontal scanning lines as to which line is recorded or printed by the recording head and being updated as the read-out from the first shift register 10 is completed; a comparator 63; N1 to N4 counters 64 to 67 for counting the number of pulses $\phi 1''$ to $\phi 4''$, respectively (outputs of high level are latched upon counting to N1, N2, N3 and N4; count and latch operations are released by reset inputs); monostable multivibrators (to be referred to be as mono-multivibrators hereinafter) 68, 69 and 70; R-S flip-flops (to be referred to as F/Fs hereinafter) 71 and 72; AND gates 73 to 80; inverters 81 to 85; and frequency dividers 88 and 89 having different frequency dividing ratios (these perform frequency division when the reset inputs are high level and start frequency division at the leading edges of the reset inputs).

When the (n−1)th horizontal scanning line is currently being recorded, the count of the line counter 62 is set at n. When the reproducing head 41 reads out the nth horizontal sync signal, the count of the H counter 61 also becomes n and the comparator 63 produces a signal SMPL of high level for one horizontal scanning period. Since the Q1 output from the F/F 71, which goes to high level when the first analog shift register 51 is empty, is at high level, the AND gate 73 is opened, and the shift pulse SH1 is supplied as the pulse $\phi 1''$ to the first analog shift register 51 so as to perform N1 sampling from the nth horizontal scanning line. When N1 pulses $\phi 1''$ are generated, the output from the N1 counter 64 goes to high level and then the AND gate 77 is closed to prevent further generation of the pulse $\phi 1''$. Simultaneously, the F/F 71 is reset, and the AND gate 73 is closed. That is, when the data is stored in the first analog shift register 51, input of the data of the next scanning line into the first analog shift register 51 is prohibited. Note that the N1 counter is reset by the leading edge of the next signal SMPL. N1 is preferably equal to the number of stages of the first analog shift register 51. An output SET1 from the N1 counter 64 is supplied to the AND gate 74. When data is not stored in the second analog shift register 53, a signal Q2 from F/F 72 is high. Since the signal Q2 is at high level at this time, the AND gate 74 is opened just after the signal SET1 has become high, the frequency dividers 88 and 89 start operating at the same timing so as to generate the shift pulses $\phi 2''$ and $\phi 3''$ which are supplied to the first and second analog shift registers 51 and 53, and the data in the first analog shift register 51 is transferred to the second analog shift register 53. In this manner, since the frequency dividers 88 and 89 start operating at the same time and the frequency of the reference clock is sufficiently higher than $\phi 2''$ and $\phi 3''$, the phase difference between the first ones of pulses $\phi 2''$ and $\phi 3''$ is constant. Therefore, the edges of the video signals are in phase so that reproduction of an excellent image may be allowed. After counting N2 shift pulses $\phi 2''$, the output pulse from the N2 counter 65 goes to high level and the AND gate 78 is closed to prevent further generation of the shift pulses $\phi 2''$. Similarly, after counting N3 shift pulses $\phi 3''$, the output pulse SET2 from the N3 counter 66 goes to high level and the AND gate 79 is closed to prevent further generation of the shift pulses $\phi 3''$. At the same time, the F/F 72 is reset, the AND gate 74 is closed, and the frequency dividers 88 and 89 stop operating. The AND gate 74 is closed while the data is stored in the second analog shift register 53. The output signal SET2 sets the F/F 71. Thus, generation of the shift pulses $\phi 1''$ is allowed after completing readout of the data from the first analog shift register 51. The N2 and N3 counters 65 and 66 are reset by the leading edge of the Q2 output from the F/F 72. The number N3 is preferably equal to the number of stages of the second analog shift register 53.

The signal SET2 representing completion of counting N3 clock pulses by the N3 counter 66 is also supplied to the AND gate 76, and an inverted signal $\overline{SET3}$ of the output signal SET3 from the N4 counter 67 is supplied to the AND gate 76. The signal SET3 is kept high for a time period after the time when the N4 counter 67 counts up to N4 but before the time when a printer ready signal PRY representing the ready state of the printer is generated. This signal SET3 is a signal representing the print prohibition period. Thus, the inverted signal $\overline{SET3}$ represents the period during which printing may be performed and the printing period. The AND gate 76 opens to supply the shift pulses SH4 to the second shift register 53 as shift pulses $\phi 4''$ while the printer is ready for printing and also after storing of the data in the second analog shift register 53 has been completed. When N4 shift pulses $\phi 4''$ are generated, the output SET3 from the N4 counter 67 goes to high level to close the AND gates 80 and 76 and to set the F/F 72.

When read-out of the data from the second analog shift register 53 is completed, the free status of register 53 is transmitted to the AND gate 74 to allow generation of the shift pulses $\phi 2''$ and $\phi 3''$. After the data of the second analog shift register 53 is read out, sampling may be performed by the first analog shift register 51 even if the signal PRY is not at high level. Thus, time base conversion may be performed at high speed. The N4 counter 67 is reset at the leading edge of the printer ready signal PRY.

In this manner, the sampled signal of the input video signal can be stored in the first analog shift register 51 in correspondence to the jitter of the input video signal. Also, the signal is produced from the second analog shift register 53 in correspondence with the scanning speed of the recording head. Therefore, the reproduced image will be of high quality and is time base compensated; the reproduced image will be free from the jitter of the input video signal and is not affected by the drift in the scanning speed of the recording head. After read-out of the data from the first analog shift register 51 has been completed, sampling of the input video signal may be performed even if data is still stored in the second analog shift register 52. After read-out of the data from the second analog shift register 53 has been completed, sampling may be performed by the second analog shift register even if the printer is not ready for printing. Therefore, time base conversion may be performed at high speed.

Although the sampling frequency of the video signal is high, there is a certain time period from the sampling of one horizontal scanning line to the sampling of the next horizontal scanning line, and also the recording speed of the printer is generally low. Accordingly, time base conversion of the above embodiment according to the present invention is particularly effective for shortening the overall printing time.

In the embodiment described above, the video signal recorded on a recording medium is reproduced and is subjected to time base conversion. However, if the video signal of the same frame is repeatedly obtainable, the received video signal or video signal read by an image pickup means may also be subjected to time base conversion according to the present invention. In such a case, when a solid-state image pickup device is used as the pickup means, the horizontal sync signal may be omitted, and the shift clocks of the image pickup device may be used as the shift pulses $\phi 1$, $\phi 1'$ and $\phi 1''$.

Although the time base conversion output is herein supplied to a printer for printing, it may also be supplied for transmission or the like.

Figure 7A:
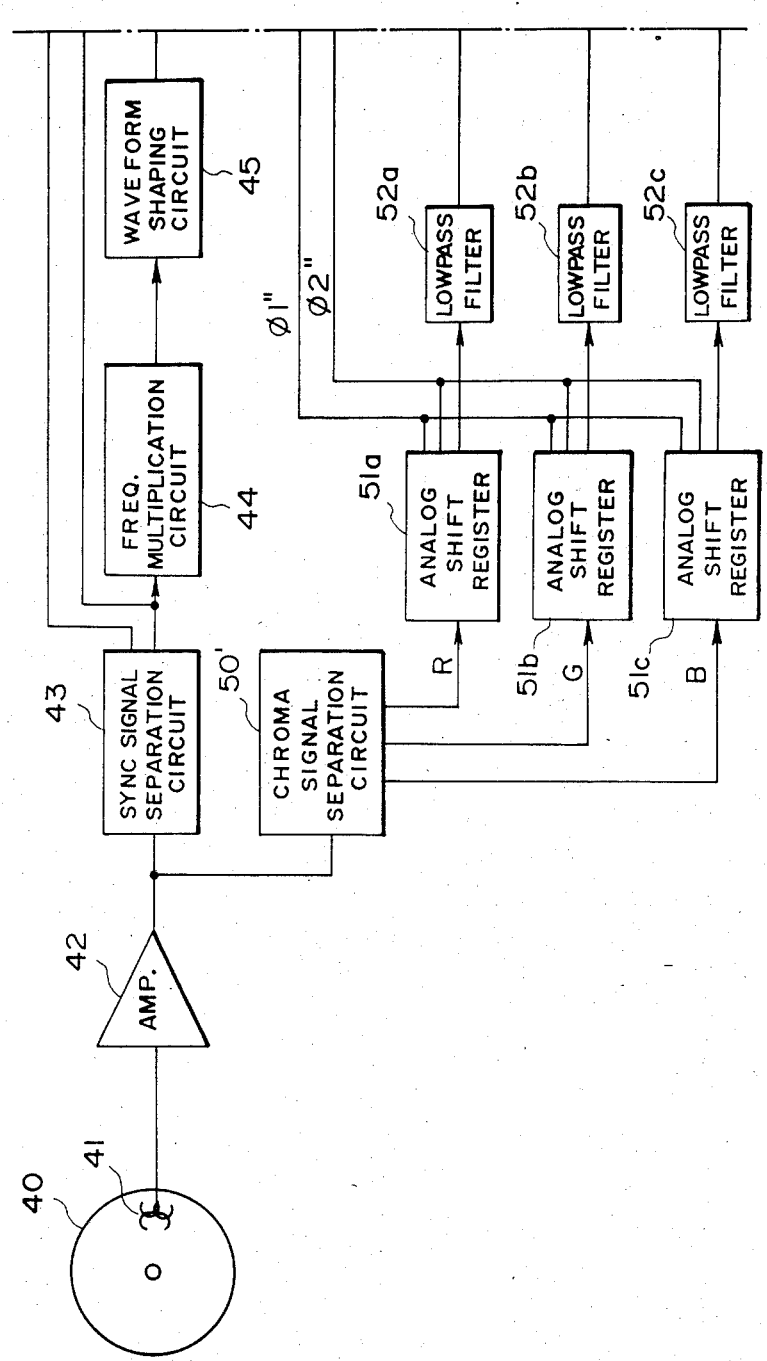
FIG. 7 composed of FIGS. 7A and 7B is a block diagram of a color video printer.

FIG. 7 is a system block diagram showing a video printer for obtaining a color printed picture from a color video signal. The same reference numerals in FIG. 7 denote parts having the same functions as in FIG. 4. The system shown in FIG. 7 includes a chroma signal separation circuit 50' for separating chroma signals of R, G and B from a picture signal; first analog shift registers 51a, 51b and 51c corresponding to the respective chroma signals; filters 52a, 52b and 52c corresponding to the respective chroma signals; second analog shift registers 53a, 53b and 53c; a chroma signal processing circuit 54' for obtaining respective print chroma signals Y (yellow), M (magenta), C (cyan) and BK (black) from the chroma signals R, G and B; and a head driver 59' for driving the ink jet heads for Y, M, C and BK.

The chroma signals R, G and B obtained by the chroma signal separation circuit 50' are sampled in response to the shift pulses $\phi 1''$ and are supplied to the first analog shift registers 51a, 51b and 51c. As in the case of the embodiment shown in FIG. 4, after the signals are transferred to the second analog shift registers 53a, 53b and 53c, they are supplied to the chroma signal processing circuit 54' in response to the shift pulses $\phi 4''$. The chroma signal processing circuit 54' performs various chroma signal processing such as $\gamma$-conversion, masking, background color removal and the like to obtain the print chroma signals Y, M, C and BK which are supplied to the head driver 59'. The ink jet heads of the respective colors (not shown) inject inks in the amounts corresponding to the chroma signal voltages so as to form a color picture corresponding to the reproduced video signal. Ink jet heads as those disclosed in U.S. Pat. No. 3,683,212 may be used. Furthermore, the present invention is not limited to an ink jet printer but may be applied to other types of recording apparatuses such as thermal printers, electrophotographic printers and the like.

Figure 8A:
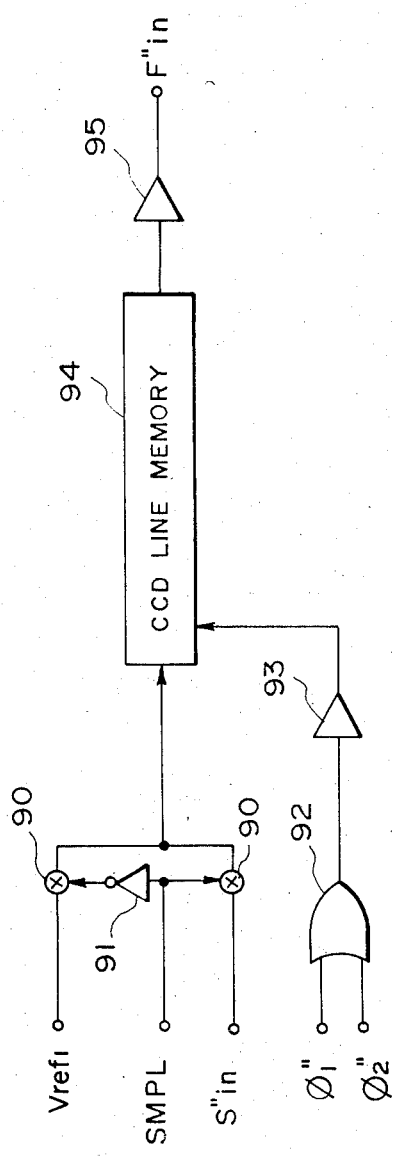
FIGS. 8A and 8B are detailed circuit diagrams of first and second analog shift registers, respectively.
Figure 8B:
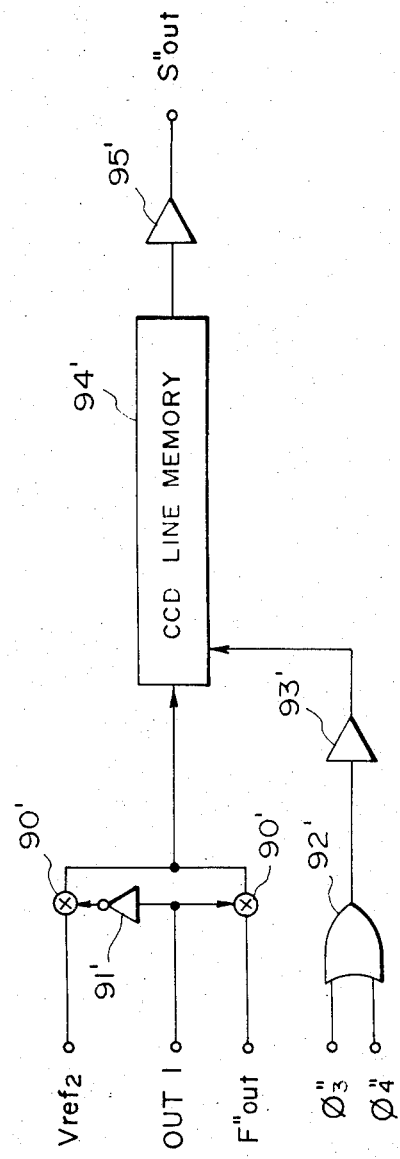

FIGS. 8A and 8B are detailed circuit diagrams of the first and second analog shift registers of the embodiment described above.

Referring to these figures, the first and second analog shift registers include analog switches 90 and 90', inverters 91 and 91', OR gates 92 and 92', buffer amplifiers 93 and 93', CCD line memories 94 and 94', and amplifiers 95 and 95'. When the signal SMPL or SET2 is at logic level "0", that is, when the first or second analog shift register is not sampling the input signal, reference signals Vref1 and Vref2 prevent introduction of the unnecessary signals in the CCD line memories 94 and 94'. In particular, the second analog shift register cannot withstand extreme level fluctuation due to the filter response characteristics. Therefore, signals of constant level are preferably supplied to the CCD line memories 94 and 94'. Although CCDs (charge coupled devices) are used for the analog shift registers, other devices such as BBD may be used instead. Furthermore, the shift registers described above shift the signals by one stage in response to one shift pulse. However, multiphase drive-type shift registers may also be used.

Figure 9:
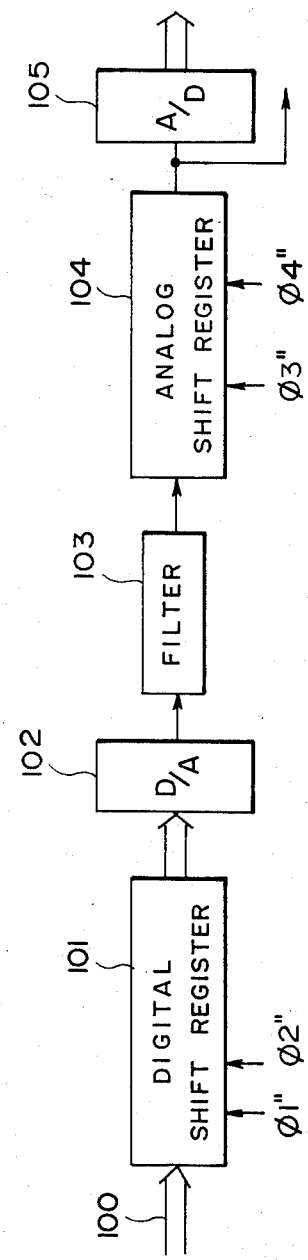
FIG. 9 is a block diagram of a time base conversion apparatus using a digital memory.

In the above embodiment, the first and second analog shift registers constitute time base conversion circuits. However, one or both of such shift registers may be a digital shift register or a digital memory which allows both read and write operations. For example, as shown in FIG. 9, when a digital signal 100 is supplied, it is subjected to a first time base conversion by a digital shift register 101. An output signal from the digital shift register 101 is converted into an analog signal by a D/A converter 102, and the analog signal is supplied to a filter 103. An output signal from the filter 103 is supplied to an analog shift register 104 and is subjected to a second time base conversion thereby. If a digital signal output is desired, the output signal from the analog shift register 104 is converted into a digital signal by an A/D converter 105. On the other hand, if an analog signal output is desired, the output signal from the analog shift register 104 may be directly used.

In this manner, analog or digital memories may be used as time base conversion circuits in accordance with the form of the input and output signals. When a digital memory is used for the first time base conversion circuit, a digital filter is applied so as to perform weighting as shown in FIGS. 3A and 3B.

When a time base conversion apparatus of the present invention is applied to a video printer, it may be effectively used for the matching between input and output speeds. An input signal is sampled by a sync signal at the input side and a sampled signal is supplied to a first shift register. The sampled signal in the first shift register is read-out therefrom in response to reference clocks which are independent of the sync signal at the input side. Therefore, in addition to the above feature of speed matching, the drift of the time base at the input side can be compensated for. And also since the signal is supplied to a second shift register in response to the reference clocks, read-out of the signal from the second shift register is performed in response to a sync signal at the output side. Thus, the drift of the time base at the output side may also be compensated for. In this manner, the drift of the input and output sides may be completely compensated for.

Since an input signal to the filter is completely compensated for with respect to the time base conversion, correct filter characteristics may be obtained stably. Even if the frequency characteristics of the filter are constant, the frequency characteristics of the overall system may be modified in accordance with the time base conversion made by the shift registers inserted before and after the filter. In other words, the frequency characteristics of the filter may be made variable by the scale conversion of the frequency axis by means of the time base conversion.

Furthermore, as shown in FIGS. 3A and 3B, a filter configuration for weighting the time-sequence signal may be simply obtained by using analog shift registers.

According to the present invention, by arranging time base conversion circuits before and after the filter, exchange of signals between two systems having different time bases may be correctly and safely performed. Furthermore, the filter characteristics of the filter may be rendered variable by suitably selecting the reference clock frequency of the time base conversion circuit.

The present invention is not limited to the particular embodiments described above, and various changes and modifications may be made within the spirit and scope of the present invention.

What is claimed is:

1. A time base conversion apparatus comprising:
   a first time base conversion circuit for subjecting an input signal to a time base conversion;
   a filter for filtering an output signal from said first time base conversion circuit; and
   a second time base conversion circuit for subjecting an output signal from said filter to a time base conversion.

2. An apparatus according to claim 1, wherein said first and second time base conversion circuits comprise first and second shift registers.

3. An apparatus according to claim 2, wherein the number of stages of said first shift register is equal to a sampling frequency of the input signal.

4. An apparatus according to claim 2, wherein the number of stages of said second shift register is equal to a sampling frequency of the output signal from said filter.

5. An apparatus according to claim 2, wherein said filter comprises a lowpass filter.

6. An apparatus according to claim 5, wherein a cutoff frequency of said lowpass filter is lower than a read-out frequency of said first shift register.

7. An apparatus according to claim 6, wherein the cutoff frequency of said lowpass filter is lower than ½ the read-out frequency of said first shift register.

8. An apparatus according to claim 2, wherein a read-out period of said first shift register and a sampling period of said second shift register are respectively fixed.

9. An apparatus according to claim 1, wherein a sampling pulse of said first shift register is synchronous with a time base of an input system.

10. An apparatus according to claim 8, wherein a sampling pulse of said first shift register is synchronous with a time base of an input system.

11. An apparatus according to claim 1, wherein a read-out pulse of said second shift register is synchronous with a time base of an output system.

12. An apparatus according to claim 8, wherein a read-out pulse of said second shift register is synchronous with a time base of an output system.

13. An apparatus according to claim 2, further comprising a weighting circuit for weighting a plurality of output signals from said first shift register.

14. An apparatus according to claim 2, wherein after data in said first shift register is transferred to said second shift register, said first shift register is capable of sampling irrespective of a status of said second shift register.

15. An apparatus according to claim 2, wherein at least one of said first and second shift registers comprises an analog shift register.

16. An apparatus according to claim 8, wherein a phase difference between an initial read-out pulse of said first shift register and an initial pulse of said second shift register is constant.

17. A time base conversion apparatus for a video signal, comprising:
    means for generating a video signal;
    means for separating a sync signal from the video signal; and
    time base converting means for sampling the video signal at a first frequency corresponding to a frequency of the sync signal to register the video signal and for reading out the registered video signal at a second frequency different from the first frequency.

18. An apparatus according to claim 15, wherein said generating means comprises means for reproducing the video signal recorded on a recording medium.

19. An apparatus according to claim 16, wherein said reproducing means repeatedly generates the video signal of a single frame.

20. An apparatus according to claim 15, wherein said time base converting means samples with a pulse which is obtained by multiplying a horizontal sync signal of the video signal.

21. An apparatus according to claim 15, wherein said time base converting means comprises:
    a first time base conversion circuit for subjecting the video signal to a time base conversion;
    a filter for filtering an output signal from said first time base conversion circuit; and
    a second time base conversion circuit for subjecting an output signal from said filter to a time base conversion.

22. An apparatus according to claim 19, wherein a read-out period of said first time base conversion circuit and a sampling period of said second time base conversion circuit are respectively fixed.

23. An apparatus according to claim 19, wherein the video signal is a color video signal; and said first and second time base conversion circuits and said filter are included for each of chroma signals of the color video signal.

24. An apparatus according to claim 19, wherein after the video signal is read out from said first time base conversion circuit to said second time base conversion circuit, said first time base conversion circuit is capable of sampling irrespective of a status of said second time base conversion circuit.

25. A video printer comprising:
    means for generating a video signal;
    time base converting means for subjecting the video signal to a time base conversion;

a recording head for printing on a recording medium in accordance with an output signal from said time base converting means; and speed detecting means for generating a speed signal corresponding to a relative speed between said recording head and the recording medium, wherein said time base converting means produces a converted video signal at a frequency corresponding to the speed signal.

26. An apparatus according to claim 23, wherein said speed detecting means detects a rotational speed of a drive motor for driving said recording head.

27. An apparatus according to claim 23, wherein said time base converting means comprises:

a first time base conversion circuit for subjecting the video signal to a time base conversion;

a filter for filtering an output signal from said first time base conversion circuit; and a second time base conversion circuit for subjecting an output signal from said filter to a time base conversion.

28. An apparatus according to claim 25, wherein a read-out period of said first time base conversion circuit and a sampling period of said second time base conversion circuit are respectively fixed.

29. An apparatus according to claim 25, wherein after data read-out from said second time base conversion circuit is completed, said second time base conversion circuit is capable of sampling irrespective of a recording status of said recording head.

* * * * *